United States Patent Office 3,441,557
Patented Apr. 29, 1969

3,441,557
DIALKYLAMINOALKYL-HESPERIDIN CONTAINING COMPOUNDS
Hans Voigt, Berlin, Germany, assignor to Dr. med. Hans Voigt Chem.-Pharm. Fabrik, Berlin-Waidmannslust, Oraniendamm, Germany
No Drawing. Filed Nov. 18, 1966, Ser. No. 595,371
Claims priority, application Austria, Sept. 23, 1966, A 8,953/66
Int. Cl. C08b *19/00;* C07g *3/00*
U.S. Cl. 260—210   9 Claims

ABSTRACT OF THE DISCLOSURE

Novel complex molecular compounds of hesperidin of the formula:

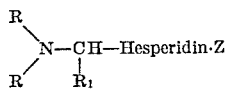

wherein R is a substituted or unsubstituted lower alkyl radical; $R_1$ is lower alkyl, phenyl, or pyridyl, and Z is an organic substance insoluble or difficultly soluble in water, e.g. organic carboxylic acid, amide, xanthine, etc. Additionally, a process is provided wherein such water soluble complex molecular compounds of hesperidine are obtained by reacting a dialkylaminoalkyl hesperidine or hesperidine, an aldehyde and a primary or secondary amine with an organic substance soluble or difficultly soluble in water. Such compounds are useful as diuretics, as agents for combating inflammations and fever, and for venous therapy.

---

The present invention relates to new water soluble, nitrogen containing molecular compounds of hesperidin, and to the method of their preparation. More particularly, the invention concerns molecular addition compounds of dialkylaminoalkylhesperidin with difficultly soluble substances, said compounds being water soluble.

It has been known that substances which are normally insoluble in water, such as theophyllin, carboxylic acids, amides, amino acids, and the like, can be brought into solution in water by the addition of solution promoters, such as polyglycols, or by the formation of salts. However, where polyglycols are used as dissolving aids for insoluble substances in water, it becomes practically impossible to recover the substances as solid bodies. Moreover, some alkali metal salts of carboxylic acids possess only a very limited stability, such as, for example, the salts of aescin.

It is also known that hesperidin can be converted to dialkylaminoalkylhesperidin by treatment with primary or secondary amines and formaldehyde. In this reaction, the specific position of entry of the dialkylaminoalkyl group into the hesperidin molecule is not known, and is accordingly designated by the letter X. The dialkylaminoalkylhesperidines of this type exhibit only very limited solubility in water, and tend to precipitate from water. According to Swiss Patent No. 348,710, the quaternization of such dialkylaminoalkylhesperidines induces improved water solubility.

In accordance with the present invention, there are provided novel molecular compounds of hesperidin, and particularly of dialkylaminoalkylhesperidin having the formula:

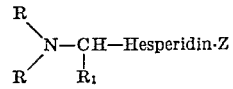

wherein R is unsubstituted or substituted alkyl, particularly lower alkyl, such as, for example, methyl, ethyl, hydroxyethyl, and the like; $R_1$ is lower alkyl, such as methyl, or aryl such as phenyl, or heterocyclic, such as pyridyl; and Z is an organic substance insoluble or difficultly soluble in water, such as, for example, a carboxylic acid, an amide, an aminocarboxylic acid, a xanthine, and the like.

The molecular compounds of the invention are in no way similar to the previously known compounds produced by quaternization or by salt formation. If, for example, theophyllin were to be taken as component X, for purposes of comparison, it would be found that theophyllin is not a substance which will quaternize with tertiary bases. It will also be found that theophyllin will only form salts with strong alkalis, which are in strongly alkaline reacting solution at pH values of 9–10. Owing to their large number of hydroxyl groups, the dialkylaminoalkylhesperidines are neither basic nor acid, but they are amphoteric, so that the possibility of ultimate solubilizing effect through the introduction of basic groups is presented. It is also recognizable that these dialkylaminoalkylhesperidines are not soluble in water.

It was there both surprising and unexpected to find, in accordance with the present invention, that the dialkylaminoalkylhesperidines could be converted into readily isolatable molecular type compounds with water-insoluble substances such as carboxylic acids and amides, by a simple warming in water or water-alcohol mixtures, employing for example lower aliphatic alcohols, such as methanol or ethanol. The hesperidin and the insoluble substance with which it forms a molecular compound are associated in molar amounts. Without warming, even in the presence of molar amounts of the reaction materials, no solution or conversion of the reactants takes place, as for example, in the case of dialkylaminoalkylhesperidin and theophyllin or aescin. Warming is necessary for the formation of the new type of molecular complexes of the invention.

There are obtained yellow to orange color compounds, which are characterized by specific physical properties, as well as by excellent water solubiltiy. From these molecular or complex compounds, upon warming with hydrochloric acid, the water-insoluble component, such as, for example, theophyllin, is recoverable, whereas the dialkylaminoalkylhesperidin is not recoverable, but only various decomposition products. This behavior is of itself indicative of a heretofore unknown and undescribed class of new substances. It is likely that, with the aid of these dialkylaminoalkylpolyhydroxyflavones, those solution promoters have been revealed which are present in plant cells and which therein perform the function of soltuion promoters for water-insoluble natural materials in aqueous solutions at a neutral pH. Such solutions can be boiled for three hours without any decomposition of the complexes taking place. At a pH of 5 and less, as well as at a pH of 8 and above, decomposition takes place. The dialkylaminoalkylhesperidines, in accordance with the invention, also make it possible to form water-soluble complexes with plant extracts which contain nonsoluble ingredients. By the formation of these complexes, it is possible, by simple warming of the plant extract in water with the dialkylaminoalkylhesperidin to prepare stable aqueous solutions.

The reaction of the hesperidin or hesperidin derivative and the insoluble is carried out in water or water-alcohol mixture at a temperature between about 80° C. and the boiling point of the solvent, for a period of about 10 to 30 minutes, or until solution has taken place. This is often accompanied by strong boiling and foaming. The dialkylaminoalkylhesperidin complex or molecular compound thus formed is recovered from the solution by precipitation with a water-miscible diluent, for example a water-miscible alcohol such as isopropanol or butanol, or a ketone, such as a dialkylketone, for example acetone, or ether. It can also be recovered by evaporation of the aqueous solution. The purification of the complex compound can be carried out by dissolving in a small amount of water and reprecipitation with a water-miscible diluent of the type previously described. The new complex compounds from orange to brown-orange colored solid substances.

In accordance with the present invention, there is also contemplated proceeding in such manner that the hesperidin in aqueous solution and in the presence of the water-insoluble substance, is converted to the dialkylaminoalkyl derivative by reaction with a primary or secondary amine and formaldehyde or other aldehyde, with formation of a Mannich base.

Examples of water-insoluble substances which are suitable for the formation of the novel molecular complexes of the present invention include xanthines, such as theophyllin, organic carboxylic acids which are insoluble or difficultly soluble in water, such as arylcarboxylic acids, for example salicylic acid, and amino acids, such as asparaginic acid. There may also be employed heterocyclic nitrogen containing acids, such as nicotinic acid, or other pyridine carboxylic acids, as well as barbituric acids, such as hydantoin and phenylethylbarbituric acid, and ureidocarboxylic acids, such as orotic acid. There may also be employed terpenecarboxylic acids, such as glycyrrizic acid, and compounds such as aescin, which is the saponin of horse chestnuts. There may also be employed various amides and imides, such as phthalimide, salicylamide, 5-chloro-2,4-disulfamylaniline, 5-chloro-7-sulfamyl-3,4-dihydro-1,2,4-benzothiadiazine-1,1-dioxide, as well as other difficulty soluble substances, such as rutin.

A wide variety of primary and secondary amines may be employed to form the dialkylaminoalkylhesperidines in accordance, the listing of the following examples being illustrative and not to be regarded as limiting: monomethylamine, dimethylamine, diethylamine, dipropylamine, dibutylamine, N-methylaminoethanol, diethanolamine, and the like.

The novel compounds of the present invention possess utility as diuretics, as agents for combating inflammations and fever, and for venous therapy. These compounds can be administered in the form of pills, drops in combination with vitamins and flavor ingredients, as well as in solution so that they can be given by injection.

The following examples illustrate the practice of the invention, but are not to be considered as limiting:

EXAMPLE 1

25 g. hesperidin were suspended in about 50 ml. of water, and there were added thereto 5 ml. diethylamine and 5 ml. formaldehyde. (37% solution). Thereupon 6 g. theophyllin were added and the mixture heated to boiling. After a short time all ingredients went into solution.

The yellow-orange solution was heated at the boiling point for another 15 minutes, then allowed to cool somewhat, and treated with 100 ml. isopropanol. There was precipitated a beautifully colored yellow-orange crystal powder, which was filtered by suction and washed with a small amount of isopropanol. It dissolved readily in water, and was insoluble in alcohols. The yield was about 26 g., M. Pt. above 270° C. decomposition. The compound was characterized as X-diethylaminomethyl-hesperidin-theophyllin.

EXAMPLE 2

6.6 g. hesperidin were heated to the boiling point in water with 2 ml. diethylamine and 2 ml. formalin. All ingredients dissolved to form a yellow-orange solution, after which 11 g. aescin were introduced, which dissolved immediately. Heating was continued for another 10 minutes at the boiling point, after which the soltuion was allowed to cool and treated with 20 ml. isopropanol. X-diethylaminomethylhesperidin-aescin was precipitated as a yellow-orange powder. It dissolved very readily in water with foaming. Yield was about 15 g., M. Pt. decomposition above 210° C.

EXAMPLE 3

7 g. of X-N-methyl-N-ethanolaminomethyl-hesperidin (prepared from hesperidin, formaldehyde and N-methylethanolamine) were dissolved in 30 ml. warm water. 6 g. rutin were introduced into the warm solution, and it was heated to boiling so that the rutin dissolved. After cooling, the solution was treated with 20 ml. isopropanol. There was precipitated X-methyl-N-ethanolamine-hesperidin-rutin as a yellow-orange powder, yield about 12 g., M. Pt. 270° C. with decomposition.

EXAMPLE 4

64 g. of X-diethylaminomethylhesperidin were suspended in 120–150 ml. of water. Into this suspension there were introduced 19 g. of 5-chloro-2,4-disulfamylaniline. The suspension was heated to boiling. After solution with foaming had taken place, which required 20–30 minutes heating, the solution was filtered hot. The filtrate was evaporated to half its volume under vacuo and the reddish colored solution was treated with 100 ml. isopropanol. There was precipitated an orange colored crystalline powder, which was filtered by suction and washed with isopropanol. It was purified by dissolving in a little water and precipitating with isopropanol. The yield of X - diethylaminomethyl - hesperidin-5-chloro-2,4-disulfamylaniline was 80 g., M. Pt. about 260° C. beginning of decomposition, carbonizes at 270° C.

In an analogous manner, there may be employed 5-chloro - 7 - sulfamyl - 3,4-dihydro-1,2,4-benzothiadiazine-1,1-dioxide in place of the 5-chloro-2,4-disulfamylaniline, to produce X-diethylamino-methylhesperidin-6-chloro-7-sulfamyl - 3,4-dihydro-1,2,4-benzothiadiazine-1,1-dioxide, which decomposes when heated above 230° C.

EXAMPLE 5

11 g. aescin were suspended in about 50 ml. water. Into this suspension there were introduced 6.8 g. of X-diethylaminomethyl-hesperidin. The solution was warmed with stirring to 80°–90° C. whereupon all ingredients dissolved with boiling. The solution was concentrated under vacuum, yielding a yellow-orange crystal powder of X-diethylaminomethylhesperidin-aescin, which was readily soluble in water, M. Pt. decomposition beginning above 210° C. The compound can be purified by dissolving in a small amount of water and precipitating with isopropanol; yield 16.7 g.

In an analogous manner there may be employed chestnut extracts with varying contents of aescin, whereby upon precipitation with isopropanol there at first separates a complex compound in the form of an oil, which solidifies to crystals upon standing. This is, if desired, warmed with methanol and isopropanol, whereby the complex practically does not dissolve at all, but becomes crystalline, while the impurities dissolve in the alcohols.

What is claimed is:

1. Complex molecular compounds of hesperidin having the formula:

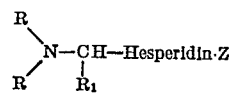

wherein R is selected from the group consisting of lower alkyl and hydroxy substituted lower alkyl, $R_1$ is selected from the group consisting of lower alkyl, phenyl and pyridyl, and Z is an organic substance insoluble or difficultly soluble in water selected from the group consisting of xanthines, monocyclic aryl carboxylic acids, asparogenic acid, pyridine carboxylic acids, barbituric acids, ureidocarboxylic acids, glycyrrizic acid, aescin, rutin, phthalimide, salicylamide, and 5-chloro-2,4-disulfamylaniline.

2. The compounds of claim 1 in which the hesperidin moiety is a dialkylaminoalkylhesperidin.
3. The compounds of claim 1 in which Z is an amide.
4. The compounds of claim 1 in which Z is theophyllin.
5. The compounds of claim 1 in which Z is aescin.
6. Diethylaminomethylhesperidin-theophyllin.
7. Methyl-N-ethanolamine-hesperidin-rutin.
8. Diethylaminomethylhesperidin - 5 - chloro-2,4-disulfamylaniline.
9. Diethylaminomethylhesperidin-aescin.

References Cited

UNITED STATES PATENTS 3,336,198   8/1967   Mueller et al.

FOREIGN PATENTS 348,710   10/1960   Switzerland.

LEWIS GOTTS, *Primary Examiner.*

J. R. BROWN, *Assistant Examiner.*

U.S. Cl. X.R.

260—999